United States Patent Office 3,056,745
Patented Oct. 2, 1962

3,056,745
HYDRAULIC OIL COMPOSITIONS
Heinrich Morschel, Leverkusen, and Hans-Werner Kauczor, Koln, Germany, assignors to Farbenfabriken Bayer Aktiengesellschaft, Leverkusen, Germany, a corporation of Germany
No Drawing. Filed Apr. 29, 1958, Ser. No. 731,639
Claims priority, application Germany Apr. 30, 1957
3 Claims. (Cl. 252—78)

The present invention relates to hydraulic oil compositions; more particularly it concerns hydraulic oil compositions based on chlorinated paraffin, chlorinated diphenyl, chlorinated terphenyl and/or alkyl, aryl or alkylaryl esters of acids of phosphorus.

According to the present invention the properties of the said hydraulic oil compositions can be improved by the addition of polyethers or polyether esters containing ether-oxygen atoms in the main chain or by the addition of polyesters.

Suitable polyethers are, for example, those obtainable by polymerisation of 1,2- and/or 1,3-oxido compounds, by polycondensation of glycols or glycol mixtures, by reaction of glycols and glycol mixtures with aliphatic dihalogen compounds or by reaction of mono- or polyhydric alcohols with 1,2- and/or 1,3-oxido compounds.

Suitable polyether esters are, for example, those obtainable by reacting polyethers still carrying free hydroxyl groups or other appropriate reactive substituents with monocarboxylic acids.

Polyethers or polyether esters which have proved especially useful are those which contain —$(CH_2)_4$—O groups, for example compounds which are obtainable by polymerisation of tetrahydrofuran or of mixtures of tetrahydrofurane and 1,2-oxido compounds, if desired, by further reaction of polyethers or polyether esters containing exchangeable halogen, with alkali metal compounds of alcohols, 1,2-, 1,3- or 1,4-glycols, phenols, or carboxylic acids. In this connection, there may further be mentioned the compounds obtainable by condensation of 1,4-butylene glycol with itself or with 1,2- or 1,3-glycols or with 1,2- or 1,3-oxido compounds as well as the compounds obtainable by reaction of 1,4-dichlorobutane, δ-dichlorodibutyl ether or δ-dichlorobutoxybutane with 1,2-, 1,3- or 1,4-glycols; in addition, compounds may also be included which are obtainable from the aforesaid compounds, provided that they still carry free hydroxyl groups, by esterification with mono-basic carboxylic acids.

By the term polyesters those compounds are to be understood in the present case which are prepared from dicarboxylic acids and glycols or polyether glycols; besides, the polyesters include compounds which are produced with the additional use of other polyhydric alcohols, such as trimethylolpropane, or monohydric alcohols and/or monocarboxylic acids.

Suitable are also such polyethers, polyether esters and polyesters wherein ether-oxygen atoms are partly replaced by sulfur atoms.

Compounds of the type which may be considered as additives are described, for example, in German patent specifications Nos. 741,478, 766,208, 883,506, 893,390, 914,438, and German Patent 1,045,662, in U.S. patent specifications Nos. 1,976,678, 2,425,755, 2,425,845, 2,559,-510, 2,570,037, in British patent specifications Nos. 642,-037, 659,103, and 716,339 as well as in French patent specification No. 898,269.

With the aid of the proposed additives it is possible, inter alia, to improve substantially the viscosity index of the aforesaid hydraulic oils and their lubricating properties. For this purpose it is advantageous to add compounds of a suitable type whose molecular weight is above 1000. Suitable proportions are easily ascertainable in each case by preliminary experiments; in general, it is sufficient to add quantities of 1–10 percent by weight, referred to the hydraulic oils used.

Compared with additives of polybutenes, polymethacrylates or alkylated polystyrenes which have already been proposed for the aforesaid hydraulic oils, the compounds to be added according to the invention are distinguished in that they show a surprisingly high stability under continuous shearing stress on the hydraulic oils.

The good compatibility of the additives proposed according to the invention with other additives commonly used for hydraulic oils is also remarkable; these include for example, anti-ageing and anti-foaming agents, thickeners, anti-corrosives, agents for improving the capacity of separating water, or extreme pressure additives.

The following examples serve to illustrate the present invention without, however, limiting the scope thereof; the parts given are by weight.

*Example 1*

A mixture is used as hydraulic oil which was prepared by dissolving in 100 parts of diphenylcresyl phosphate at 40–50° C. 5 parts of a polyether of an average molecular weight of 5000 obtained according to Example 1 of German patent specification No. 914,438 from tetrahydrofurane and ethylene oxide in a molecular ratio of 3:4 with the use of 1 mol percent of boron fluoride compound of tetrahydrofurane.

The viscosity index of the diphenylcresyl phosphate is substantially improved by the addition of the polyether as shown in the following table:

[Viscosity of the diphenylcresyl phosphate in centistokes]

| Temperature, ° C. | without addition of the polyether | with addition of the polyether |
|---|---|---|
| 20.0 | 48.5 | 106.0 |
| 37.8 | 18.8 | 40.8 |
| 50.0 | 11.7 | 27.0 |
| 98.8 | 3.4 | 6.6 |
| Viscosity index | +43 | +124 |

*Example 2*

A mixture is used as hydraulic oil which was obtained by dissolving 1 part of the following tetrahydrofurane polymerisation product having a K-value of 82 and an average molecular weight of 12000 in 100 parts of trichlorodiphenyl at 80–90° C.

The viscosity index of the trichlorodiphenyl is substantially improved by the addition of the polyether.

[Viscosity of the trichlorodiphenyl in centistokes]

| Temperature, ° C. | without addition of the polyether | with addition of the polyether |
|---|---|---|
| 20.0 | 55.4 | 310.9 |
| 37.8 | 15.7 | 78.6 |
| 50.0 | 8.7 | 40.3 |
| 98.8 | 2.2 | 8.3 |
| Viscosity index | −290 | +79 |

The tetrahydrofurane polymerisation product was prepared in the following manner:

1440 parts of tetrahydrofurane, 7.4 parts of the boron fluoride compound of tetrahydrofurane and 3 parts of 1,2-butenoxide were polymerised at 0 to −5° C. according to Example 2 of German patent specification No. 741,478. The reaction mixture which became viscous, was kept stirring by slow addition of 1990 parts of chlorobenzene; after standing at 0 to −5° C. for five days, the mixture was treated with 20 parts of triethanolamine and 5 parts of phenyl-β-naphthylamine. The components which were volatile up to a temperature of 200° C. and at a pressure of 10 mm. Hg were then removed from the reaction mixture by distillation under reduced pressure.

*Example 3*

A mixture is used as hydraulic oil which was prepared by treating at 50–60° C. a mixture of 50 parts of hexachlorodiphenyl, 20 parts of pentachlorodiphenyl and 30 parts of trichlorobenzene, with 5 parts of the polyether described in Example 1.

The viscosity index of the original mixture is substantially improved by the addition of the polyether.

[Viscosity of the mixture in centistokes]

| Temperature, ° C. | without addition of the polyether | with addition of the polyether |
|---|---|---|
| 20.0 | 39.0 | 118.8 |
| 37.8 | 13.4 | 38.2 |
| 50.0 | 8.0 | 21.8 |
| 98.8 | 2.0 | 5.5 |
| Viscosity index | −264 | +83 |

*Example 4*

A mixture of 50 parts of tetrachlorodiphenyl and 50 parts of diphenylcresyl phosphate, which is intended to be used as hydraulic oil, is treated at 60–70° C. with 5 parts of the polyether indicated in Example 1. The viscosity index of the original mixture is substantially improved by the addition of the polymer.

[Viscosity of the mixture in centistokes]

| Temperature, ° C. | without addition of the polyether | with addition of the polyether |
|---|---|---|
| 20.0 | 82.4 | 201.0 |
| 37.8 | 23.9 | 57.9 |
| 50.0 | 13.3 | 32.1 |
| 98.8 | 3.3 | 7.2 |
| Viscosity index | −113 | +91 |

*Example 5*

In a mixture of 50 parts of tetrachlorodiphenyl and 50 parts of diphenylcresyl phosphate, which is intended to be used as hydraulic oil, there are dissolved at 50–60° C. 5 parts of a polyether of an average molecular weight of 5000 prepared according to Example 1 of German patent specification No. 914,438 from tetrahydrofurane, ethylene oxide and 1,2-propylene oxide in a molecular ratio of 3:3:2 with the use of 1 mol percent of the boron trifluoride compound of tetrahydrofurane. The viscosity index of the original mixture is substantially improved by the addition of the polyether.

[Viscosity of the mixture in centistokes]

| Temperature, ° C. | without addition of the polyether | with addition of the polyether |
|---|---|---|
| 20.0 | 82.4 | 194.6 |
| 37.8 | 23.9 | 57.1 |
| 50.0 | 13.3 | 31.4 |
| 98.8 | 3.3 | 7.0 |
| Viscosity index | −113 | +83 |

*Example 6*

In a mixture of 50 parts of tetrachlorodiphenyl and 50 parts of diphenylcresyl phosphate, which is intended to be used as hydraulic oil, there are dissolved at 60–70° C. 5 parts of the polyether described in Example 1. 0.1 part of chlorinated natural rubber, a 20 percent solution in butanol and xylene (95:5) having a viscosity of about 90 centistokes, is subsequently added at 70–80° C.

The viscosity index of the original mixture is substantially improved by these additives.

[Viscosity of the mixture in centistokes]

| Temperature, ° C. | without the additives | with the additives |
|---|---|---|
| 20.0 | 82.4 | 221.0 |
| 37.8 | 23.9 | 63.1 |
| 50.0 | 13.3 | 34.5 |
| 98.8 | 3.3 | 7.5 |
| Viscosity index | −113 | +88 |

*Example 7*

A mixture is used as hydraulic oil which was prepared by dissolving in 97 parts of diphenylxylenyl phosphate at 40–50° C. 3 parts of a polyether ester which was obtained by esterifying the polyether of Example 5 containing terminal free hydroxyl groups with butyric acid.

The viscosity index of the diphenylxylenyl phosphate is substantially improved by the addition of the polyether ester.

[Viscosity of the diphenylxylenyl phosphate in centistokes]

| Temperature, ° C. | without addition of the polyether ester | with addition of the polyether ester |
|---|---|---|
| 20.0 | 50.4 | 90.5 |
| 37.8 | 19.6 | 34.7 |
| 50.0 | 12.0 | 21.1 |
| 98.8 | 3.49 | 5.79 |
| Viscosity index | +32 | +118 |

*Example 8*

A mixture is used as hydraulic oil which was prepared by dissolving in 95 parts of diphenylxylenyl phosphate at 40–50° C. 5 parts of a polyester of adipic acid and ethylene glycol having an average molecular weight of 450.

The viscosity index of the diphenylxylenyl phosphate is substantially improved by the addition of the polyester.

[Viscosity of the diphenylxylenyl phosphate in centistokes]

| Temperature, ° C. | without addition of the polyether ester | with addition of the polyether ester |
|---|---|---|
| 20.0 | 50.4 | 59.5 |
| 37.8 | 19.6 | 22.2 |
| 50.0 | 12.0 | 13.8 |
| 98.8 | 3.49 | 3.85 |
| Viscosity index | +32 | +50 |

*Example 9*

A mixture is used as hydraulic oil which was prepared by dissolving in 95 parts of diphenylxylenyl phosphate at 40–50° C. 5 parts of a polyester having an average molecular weight of 2000 which was prepared from adipic acid and diethylene glycol with the addition of a small amount of trimethylolpropane.

The viscosity index of the diphenylxylenyl phosphate is substantially improved by the addition of the polyester.

[Viscosity of the diphenylxylenyl phosphate in centistokes]

| Temperature, ° C. | without addition of the polyether ester | with addition of the polyether ester |
| --- | --- | --- |
| 20.0 | 50.4 | 83.9 |
| 37.8 | 19.6 | 31.4 |
| 50.0 | 12.0 | 18.6 |
| 98.8 | 3.49 | 5.08 |
| Viscosity index | +32 | +96 |

*Example 10*

In a mixture of 45 parts of tetrachlorodiphenyl and 45 parts of diphenylcresyl phosphate which is intended to be used as hydraulic oil there are dissolved at 40–50° C. 5 parts of the polyester applied in Example 9.

The viscosity index of the original mixture is substantially improved by the addition of the polyester.

[Viscosity of the mixture in centistokes]

| Temperature, ° C. | without addition of the polyether ester | with addition of the polyether ester |
| --- | --- | --- |
| 20.0 | 82.4 | 150.2 |
| 37.8 | 23.9 | 41.2 |
| 50.0 | 13.3 | 22.0 |
| 98.8 | 3.3 | 5.03 |
| Viscosity index | −113 | +15 |

*Example 11*

A mixture is used as hydraulic oil which was prepared by dissolving in 95 parts of diphenylcresyl phosphate at 40–50° C. 5 parts of a polyether ester which was prepared by esterifying polypropylene glycol of an average molecular weight of 3500 with lauric acid.

The viscosity of the diphenylcresyl phosphate is substantially improved by the addition of the polyether ester.

[Viscosity of the diphenylcresyl phosphate in centistokes]

| Temperature, ° C. | without addition of the polyether ester | with addition of the polyether ester |
| --- | --- | --- |
| 20.0 | 48.5 | 59.0 |
| 37.8 | 18.8 | 23.1 |
| 50.0 | 11.7 | 14.5 |
| 98.8 | 3.46 | 4.17 |
| Viscosity index | +43 | +84 |

*Example 12*

A mixture is used as hydraulic oil which was prepared by dissolving in 97 parts of diphenylcresyl phosphate at 40–50° C. 3 parts of a polyether ester which was obtained in the following manner: 14.3 moles of polypropylene glycol of an average molecular weight of 1000 were reacted with 29 moles of adipic acid and the free carboxyl groups still present in the reaction product formed were esterified with a mixture of 11.4 diethylene glycol and 5 moles trimethylol propane.

The viscosity index of the diphenylcresyl phosphate is substantially improved by the addition of the polyether ester.

[Viscosity of the diphenylcresyl phosphate in centistokes]

| Temperature, ° C. | without addition of the polyether ester | with addition of the polyether ester |
| --- | --- | --- |
| 20.0 | 48.5 | 85.0 |
| 37.8 | 18.8 | 32.4 |
| 50.0 | 11.7 | 19.5 |
| 98.8 | 3.46 | 5.36 |
| Viscosity index | +43 | +109 |

The viscosity index was determined in all examples according to Zerbe, Mineraloele und verwandte Produkte (1952), pages 32–38.

We claim:

1. A hydraulic fluid consisting essentially of (a) at least one member selected from the group consisting of trichlorobenzene, chlorinated diphenyl containing at least three chlorine atoms, diphenylcresyl-phosphate and diphenyl-xylenyl-phosphate, and (b) at least one member of the group consisting of a polyoxyalkylene diol whose oxyalkylene groups are —(CH$_2$)$_4$—O— groups, polyoxyalkylene diol whose oxyalkylene groups are

—(CH$_2$)$_4$—O— groups and —(CH$_2$)$_2$—O— groups, polyoxyalkylene diol whose oxyalkylene groups are —(CH$_2$)$_4$—O— groups, —(CH$_2$)$_2$—O— groups and —CH(CH$_3$)—CH$_2$—O— groups, polyoxyalkylene diol whose oxyalkylene groups are —(CH$_2$)$_4$—O— groups and whose hydroxyl groups are esterified by low molecular weight aliphatic monobasic carboxylic acids, polyoxyalkylene diol whose oxyalkylene groups are —(CH$_2$)$_4$—O— groups and —(CH$_2$)$_2$—O— groups and whose hydroxyl groups are esterified by low molecular weight aliphatic monobasic carboxylic acids, and polyoxyalkylene diol whose oxyalkylene groups are —(CH$_2$)$_4$—O— groups,

—(CH$_2$)$_2$—O— groups and —CH(CH$_3$)—CH$_2$—O— groups and whose hydroxyl groups are esterified by low molecular weight aliphatic monobasic carboxylic acids, the molecular weight of the polyoxyalkylene diols ranging from 5,000 to 12,000 and the ratio of the components (a) to the components (b) being 10:1 to 100:1.

2. A hydraulic fluid according to claim 1 consisting of approximately 96 percent by weight of diphenylxylenyl phosphate and approximately 4 percent by weight of a polyether of an average molecular weight of 5000 obtained from tetrahydrofurane, ethylene oxide and 1,2-propylene oxide in a molecular ratio of 3:3:2.

3. A hydraulic fluid according to claim 1 consisting of approximately 47 percent by weight of tetrachlorodiphenyl, approximately 47 percent by weight of diphenylcresyl phosphate and approximately 6 percent by weight of a polyether of an average molecular weight of 5000 obtained from tetrahydrofurane and ethylene oxide in a molecular ratio of 3:4.

References Cited in the file of this patent

UNITED STATES PATENTS

| 2,521,402 | Osborn | Sept. 5, 1950 |
| 2,543,735 | Stewart et al. | Feb. 27, 1951 |
| 2,559,510 | Mikeska et al. | July 3, 1951 |
| 2,570,037 | Smith et al. | Oct. 2, 1951 |
| 2,707,176 | Gamrath et al. | Apr. 26, 1955 |
| 2,934,501 | Moreton | Apr. 26, 1960 |

FOREIGN PATENTS

| 534,111 | Canada | Dec. 4, 1956 |
| 681,357 | Great Britain | Oct. 22, 1952 |

OTHER REFERENCES

"The Preparation of Tetrahydrofuran Polymers as a Synthetic Lubricant for Metals," publ. by U.S. Naval Technical Mission in Europe T.L.R. No. 123–45(s), July 5, 1946, pages 1–7.